United States Patent [19]
Sato

[11] Patent Number: 5,991,095
[45] Date of Patent: Nov. 23, 1999

[54] COMPACT TWO-GROUP ZOOM LENS

[75] Inventor: Kenichi Sato, Ageo City, Japan

[73] Assignee: Fuji Photo Optical Co., Ltd., Omiya City, Japan

[21] Appl. No.: 09/178,541

[22] Filed: Oct. 26, 1998

[30] Foreign Application Priority Data

Nov. 13, 1997 [JP] Japan .................................. 9-329602

[51] Int. Cl.$^6$ .............................. G02B 15/14; G02B 3/02
[52] U.S. Cl. ........................................... 359/692; 359/717
[58] Field of Search .................................. 359/692, 691, 359/717

[56] References Cited

U.S. PATENT DOCUMENTS

| 5,610,767 | 3/1997 | Ito ............................................ 359/692 |
| 5,663,838 | 9/1997 | Hasushita et al. ...................... 359/692 |
| 5,687,028 | 11/1997 | Ito ............................................ 359/692 |

FOREIGN PATENT DOCUMENTS 3-200913  9/1991  Japan .
6-82696  3/1994  Japan .

*Primary Examiner*—Georgia Epps
*Assistant Examiner*—Evelyn A. Lester
*Attorney, Agent, or Firm*—Arnold International; Bruce Y. Arnold

[57] ABSTRACT

A compact two-group zoom lens, wherein zooming is accomplished by changing the distance between the two lens groups. In order from the object side, the first lens group G1 is of positive refracting power and includes a negative meniscus lens element $L_1$ with its concave surface on the object side, a positive meniscus lens element $L_2$ made of plastic having two aspherical surfaces with its convex surface on the object side, and a biconvex lens element $L_3$ having different surface curvatures, with its surface of stronger curvature on the image side. The second lens group G2 includes a positive meniscus lens element $L_4$ that has two aspherical surfaces with its concave surface on the object side, and a negative meniscus lens element $L_5$ with its concave surface on the object side. It is preferable that lens element $L_4$ has an aspherical surface of positive refracting power and lens element $L_2$ has an aspherical surface of negative refracting power. Also, it is preferable that lens elements $L_2$ and $L_4$ are formed with an acrylic-system resin. Furthermore, the following conditions are satisfied:

$$1.4 < f_w/f_1 < 2.0 \qquad (1)$$

$$-0.77 < R_9/f_1 < -0.35 \qquad (2)$$

wherein $f_w$ is the focal length of the compact two-group zoom lens at the wide-angle end, $f_1$ is the focal length of the first lens group, and $R_9$ is the radius of curvature of the object-side surface of the fifth lens element.

11 Claims, 10 Drawing Sheets

Wide-angle end

Telephoto end

COMPACT TWO-GROUP ZOOM LENS

BACKGROUND OF THE INVENTION

Recently, among lens systems used for lens-shutter cameras, ones equipped with a zoom lens are becoming mainstream. Because this kind of zoom lens is required to be compact, two-group zoom lenses with a telescope-type refractive power arrangement are commercialized wherein, in order from the object side, the first lens group has positive refracting power and the second lens group has negative refracting power.

Furthermore, many lens systems are known where the number of lens elements is reduced and the optical performance is improved by using an aspherical surface as the lens element surface.

As for this kind of technology, zoom lenses having six lens elements in two groups are described in Japan patent publications H03-200913 and H06-82696. Also, zoom lenses having five lens elements in two groups are described in U.S. Pat. Nos. 5,663,838 and 5,687,028. However, there is a need for further improvements in miniaturization and cost reduction.

BRIEF SUMMARY OF THE INVENTION

The present invention relates to a compact two-group zoom lens for lens-shutter cameras which covers a wide-angle viewing range. A first object of the invention is to provide a more compact two-group zoom lens which can enable miniaturization and cost reduction by regulating the shapes of the various lens elements and by satisfying specified conditions, while maintaining good optical performance. Also, although plastic is used as the material for the aspherical lens elements due to its advantage in ease of manufacture, there are some plastic materials which have a high molding temperature, a large imaginary component in the complex index of refraction, etc., which make these plastics unsuitable for use as lens elements. Of course, the best materials for lens elements are in higher demand. Therefore, a second object of the invention is to provide a compact two-group zoom lens where lens elements having aspherical surfaces are formed of the best plastic lens forming material for ease of manufacture and good optical performance.

BRIEF DESCRIPTION OF THE DRAWINGS

The present invention will become more fully understood from the detailed description given below and the accompanying drawings, which are given by way of illustration only and thus are not imitative of the present invention, wherein:

FIG. 1(a) and FIG. 5(b) show the basic lens construction for all embodiments of this invention. FIG. 1(a) illustrates the lens element positions at the wide-angle end and FIG. 1(b) illustrates the lens element positions at the telephoto end.

DETAILED DESCRIPTION

The compact two-group zoom lens of this invention is composed of, in order from the object side, a positive first lens group G1 including three lens elements and a negative second lens group G2 including two lens elements, wherein zooming is performed by changing the distance between these two lens groups.

The first lens group G1 includes, in order from the object side, a first lens element $L_1$ shaped as a negative meniscus with its concave surface on the object side, a second lens element $L_2$ formed of plastic in a positive meniscus shape with its convex surface on the object side, and a third lens element $L_3$ that is biconvex.

The second lens group G2 includes, in order from the object side, a fourth lens element $L_4$ having an aspherical surface and formed of plastic in a positive meniscus shape with its concave surface on the object side, and a fifth lens element $L_5$ having a negative meniscus shape with its concave surface on the object side.

Furthermore, the compact two-group zoom lens satisfies the following conditions:

$$1.4 < f_w/f_1 < 2.0 \qquad (1)$$

$$-0.77 < R_9/f_1 < -0.35 \qquad (2)$$

where $f_w$ is the focal distance of the compact two-group zoom lens at the wide-angle end, $f_1$ is the focal distance of the first lens group, and $R_9$ is the radius of curvature of the object-side surface of the fifth lens element.

It is preferable that the second lens element has at least one aspherical surface of negative refracting power, and that the fourth lens element has at least one aspherical surface of positive refracting power. Furthermore, it is preferable that the second lens element and the fourth lens element are formed with acrylic-system resin.

Specific embodiments of this invention will now be explained below with reference to the drawings.

Embodiment 1

Figure 1A:
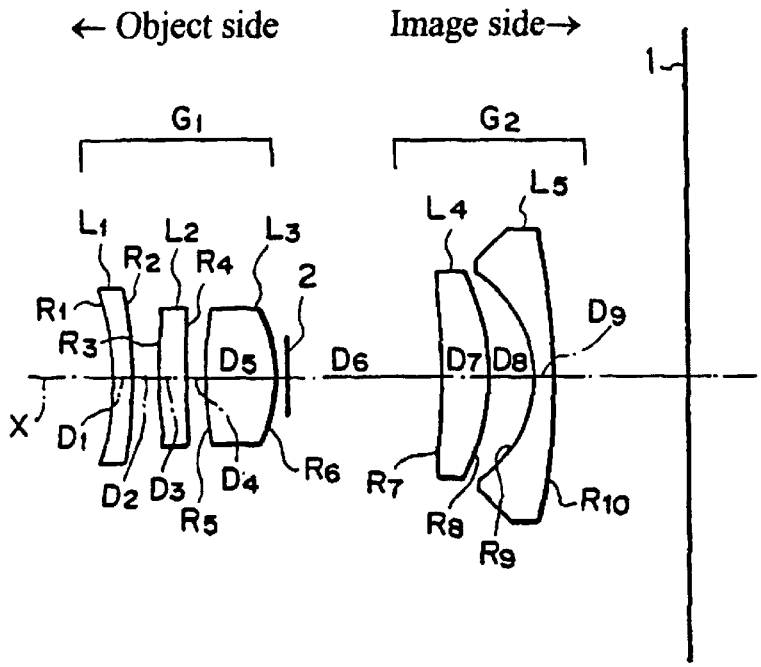

FIG. 1 illustrates the overall structure of a compact two-group zoom lens according to Embodiments 1–3. The zoom lens is composed of, in order from the object side, a first lens group G1 that has positive refracting power and includes three lens elements, and a second lens group G2 that has negative refracting power and includes two lens elements. By moving these two lens groups along the optical axis X, as the distance between them is being changed, the focal distance of the compact two-group zoom lens changes, and the light flux is efficiently concentrated to an image-forming position at the image plane.

The first lens group G1 includes, in order from the object side: a negative meniscus lens element $L_1$ with its concave surface on the object side; a positive meniscus lens element $L_2$, made of plastic and having two aspherical surfaces, with its convex surface on the object side; and a biconvex lens element $L_3$, having different surface curvatures on its opposite sides, with the surface of greater curvature on the image side. The second lens group G2 includes, in order from the object side: a lens element $L_4$ composed of plastic and shaped as a positive meniscus element having two aspherical surfaces with its concave surface on the object side; and, a lens element $L_5$ composed of a negative meniscus element with its concave surface on the object side.

Also, this two-group zoom lens has a shutter 2 between the first lens group G1 and the second lens group G2. By placing this shutter 2 between the two lens groups, it becomes possible to keep the overall length of the zoom lens small. The second lens element $L_2$ has at least one aspherical surface of negative refracting power, so that coma and spherical aberration decrease. The fourth lens element $L_4$ has at least one aspherical surface of positive power, so that distortion and curvature of field (i.e., of the image surface) decrease. Also, the second lens element $L_2$ and the fourth lens element $L_4$, which each include an aspherical surface, are formed from an acrylic-system resin. Acrylic-system resin has a low molding temperature, which is advantageous in ease of manufacture. In addition, since the imaginary component of its complex refractive index is small, acrylic-system resin provides good optical performance. And, as compared with polycarbonate (PC) resin, etc., acrylic-system resin has an advantage of lower cost of raw material.

The two-group zoom lens in each embodiment is designed to satisfy the following conditions:

$$1.4 < f_w/f_1 < 2.0 \quad \text{Condition (1)}$$

$$-0.77 < R_9/f_1 < -0.35 \quad \text{Condition (2)}$$

where $f_w$ is the focal distance of the compact two-group zoom lens at the wide-angle end, $f_1$ is the focal distance of the first lens group, and $R_9$ is the radius of curvature of the object-side surface of the fifth lens element.

If the value in Condition (1) drops below the lower limit, displacement of each lens group becomes large, making miniaturization difficult. On the other hand, if it exceeds the upper limit, higher-order aberrations occur easily, making correction of aberrations difficult.

Also, if the value in Condition (2) drops below the lower limit, the radius of curvature of the object-side surface of the fifth lens element becomes too small, making the manufacture of this element more difficult. On the other hand, if it exceeds the upper limit, the correction of field curvature (i.e., curvature of the image plane) at the wide-angle end becomes difficult.

According to this embodiment, by satisfying the above-described construction of each lens element and the above conditions, it is possible to favorably correct various aberrations over the entire range of photographing distances, from long to short, while satisfying the demand of miniaturization, obtaining a high optical performance over the entire range of object distances, and, furthermore, while improving the ease of manufacture and lowering costs as compared to conventional lens systems.

Table 1 lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of Embodiment 1. Those surfaces with a * to the right of the surface number in Table 1 are aspherical surfaces, and the aspherical surface shape is expressed by Eq. (A) below.

$$Z = CH^2/\{1+(1-KC^2H^2)^{1/2}\} + A_4H^4 + A_6H^6 + A_8H^8 + A_{10}H^{10} \quad \text{(Equation A)}$$

where

Z is the length (in mm) of a line drawn from a point on the aspherical surface at height H from the optical axis to the tangential plane of the aspherical surface vertex, C (=1/R) is the curvature of the aspherical surface near the optical axis, H is the height (in mm) from the optical axis, K is the eccentricity, and $A_4$, $A_6$, $A_8$, and $A_{10}$ are the 4th, 6th, 8th, and 10th aspherical coefficients.

Also, the focal distance f', the f-number $F_{NO}$, and image angle $2\omega$ of the compact two-group zoom lens of this embodiment are listed in the lower part of the Table 1.

TABLE 1

| # | R | D | $N_d$ | $V_d$ |
|---|---|---|---|---|
| 1 | −13.874 | 0.90 | 1.84665 | 23.9 |
| 2 | −25.977 | 1.49 | | |
| 3* | 250.000 | 1.20 | 1.49023 | 57.5 |
| 4* | 276.655 | 1.04 | | |
| 5 | 22.3397 | 3.40 | 1.48749 | 70.4 |
| 6 | −7.5370 | variable (8.13–4.00) | | |
| 7* | −20.333 | 2.23 | 1.49023 | 57.5 |
| 8* | −11.450 | 2.055 | | |
| 9 | −5.983 | 1.00 | 1.71300 | 53.9 |
| 10 | −37.468 | | | |

| f' = 22.3–45.1 | $F_{NO}$ = 5.9–9.2 | $2\omega$ = 74.6°–41.8° |

In addition, Table 2 lists values of the coefficients $A_4$, $A_6$, $A_8$, $A_{10}$, and K in Eq. (A) above.

TABLE 2

| # | K | $A_4$ | $A_6$ | $A_8$ | $A_{10}$ |
|---|---|---|---|---|---|
| 3 | −7.526813× $10^0$ | −6.775195×$10^{-4}$ | −2.720918×$10^{-6}$ | −4.290919×$10^{-7}$ | 5.283378×$10^{-10}$ |
| 4 | 7.186544×$10^{-1}$ | 4.509014×$10^{-6}$ | 7.671375×$10^{-6}$ | 1.024648×$10^{-7}$ | −2.267622×$10^{-11}$ |
| 7 | −2.346723× $10^1$ | −2.315072×$10^{-4}$ | 3.615716×$10^{-5}$ | −1.256350×$10^{-6}$ | 2.303000× $10^{-8}$ |
| 8 | −9.213355× $10^0$ | −1.001088×$10^{-3}$ | 3.580379×$10^{-5}$ | −1.019483×$10^{-6}$ | 9.534009× $10^{-9}$ |

Embodiment 2

The compact two-group zoom lens in Embodiment 2 has a similar lens shape construction as that in Embodiment 1 and, as it is also designed to satisfy conditions (1) and (2), it also has a performance and compactness similar to that of Embodiment 1.

Table 3 lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of Embodiment 2. Those surfaces with a * to the right of the surface number in Table 3 are aspherical surfaces as described above, and the aspherical surface shape is expressed by Eq. (A) above.

In addition, the focal distance f', the f-number $F_{NO}$, and image angle 2ω of the zoom lens of this embodiment are as shown in the lower part of the Table 3.

TABLE 3

| # | R | D | $N_d$ | $V_d$ |
|---|---|---|---|---|
| 1 | −13.555 | 0.90 | 1.84665 | 23.9 |
| 2 | −25.721 | 1.49 | | |
| 3* | 120.000 | 1.20 | 1.49023 | 57.5 |
| 4* | 1000.000 | 1.04 | | |
| 5 | 26.099 | 3.40 | 1.48749 | 70.4 |
| 6 | −7.445 | variable (7.61–3.70) | | |
| 7* | −20.416 | 2.23 | 1.49023 | 57.5 |
| 8* | −11.676 | 2.10 | | |
| 9 | −5.944 | 1.00 | 1.72916 | 54.8 |
| 10 | −31.455 | | | | f' = 23.9–48.4   $F_{NO}$ = 5.9–9.2   2ω = 72.0°–39.4°

In addition, Table 4 lists values of the coefficients $A_4$, $A_6$, $A_8$, $A_{10}$, and K in Eq. (A) above.

TABLE 4

| # | K | $A_4$ | $A_6$ | $A_8$ | $A_{10}$ |
|---|---|---|---|---|---|
| 3 | −7.525426× $10^0$ | −6.822857×$10^{-4}$ | −3.847370×$10^{-6}$ | −4.289756×$10^{-7}$ | 5.508285×$10^{-10}$ |
| 4 | 7.187789×$10^{-1}$ | 4.509014×$10^{-6}$ | 7.016549×$10^{-6}$ | 7.834742×$10^{-8}$ | −2.461998×$10^{-10}$ |
| 7 | −2.361019× $10^1$ | −2.222260×$10^{-4}$ | 3.644828×$10^{-5}$ | −1.251500×$10^{-6}$ | 2.304730× $10^{-8}$ |
| 8 | −9.376626× $10^0$ | −9.912453×$10^{-4}$ | 3.500264×$10^{-5}$ | −1.037293×$10^{-6}$ | 9.313598× $10^{-9}$ |

Embodiment 3

The compact two-group zoom lens in Embodiment 3 has a similar lens shape construction as that in Embodiments 1 and 2, and, as it is also designed to satisfy conditions (1) and (2), it also has a performance and compactness similar to that of Embodiments 1 and 2. Table 5 lists the surface number #, in order from the object side, the radius of curvature R (in mm) of each lens element surface near the optical axis, the on-axis spacing D (in mm) between each lens element surface, as well as the index of refraction $N_d$ and the Abbe number $V_d$ (at the sodium d line) of Embodiment 3. Those surfaces with a * to the right of the surface number in Table 5 are aspherical surfaces as described above, and the aspherical surface shape is expressed by Eq. (A) above. Also, the focal distance f', f-number $F_{NO}$, and image angle 2ω of the zoom lens of this embodiment are listed in the lower part of the Table 5.

TABLE 5

| # | R | D | $N_d$ | $V_d$ |
|---|---|---|---|---|
| 1 | −13.602 | 0.90 | 1.80518 | 25.5 |
| 2 | −27.274 | 1.44 | | |
| 3* | 124.070 | 1.20 | 1.49023 | 57.5 |
| 4* | 461.173 | 1.03 | | |
| 5 | 24.989 | 3.40 | 1.48749 | 70.4 |
| 6 | −7.437 | variable (7.60–3.73) | | |
| 7* | −22.000 | 2.40 | 1.49023 | 57.5 |
| 8* | −11.598 | 1.91 | | |
| 9 | −6.083 | 1.00 | 1.71300 | 53.9 |
| 10 | −43.090 | | | | f' = 23.9–48.3   $F_{NO}$ = 5.9–9.2   2ω = 70.8°–39.2°

In addition, Table 6 lists values of the coefficients $A_4$, $A_6$, $A_8$, $A_{10}$, and K in Eq. (A) above.

TABLE 6

| # | K | $A_4$ | $A_6$ | $A_8$ | $A_{10}$ |
|---|---|---|---|---|---|
| 3 | −7.526163× $10^0$ | 6.890391×$10^{-4}$ | −3.878944×$10^{-6}$ | −4.825356×$10^{-7}$ | 1.091029×$10^{-10}$ |
| 4 | 7.181969×$10^{-1}$ | 4.509014×$10^{-6}$ | 5.395135×$10^{-6}$ | 1.326543×$10^{-7}$ | 2.376744×$10^{-10}$ |
| 7 | −2.387527× $10^1$ | 2.110080×$10^{-4}$ | 3.546625×$10^{-5}$ | −1.266724×$10^{-6}$ | 2.289105× $10^{-8}$ |
| 8 | −9.164044× $10^0$ | −1.016392×$10^{-3}$ | 3.612525×$10^{-5}$ | −1.031340×$10^{-6}$ | 9.436932× $10^{-9}$ |

Figure 2:
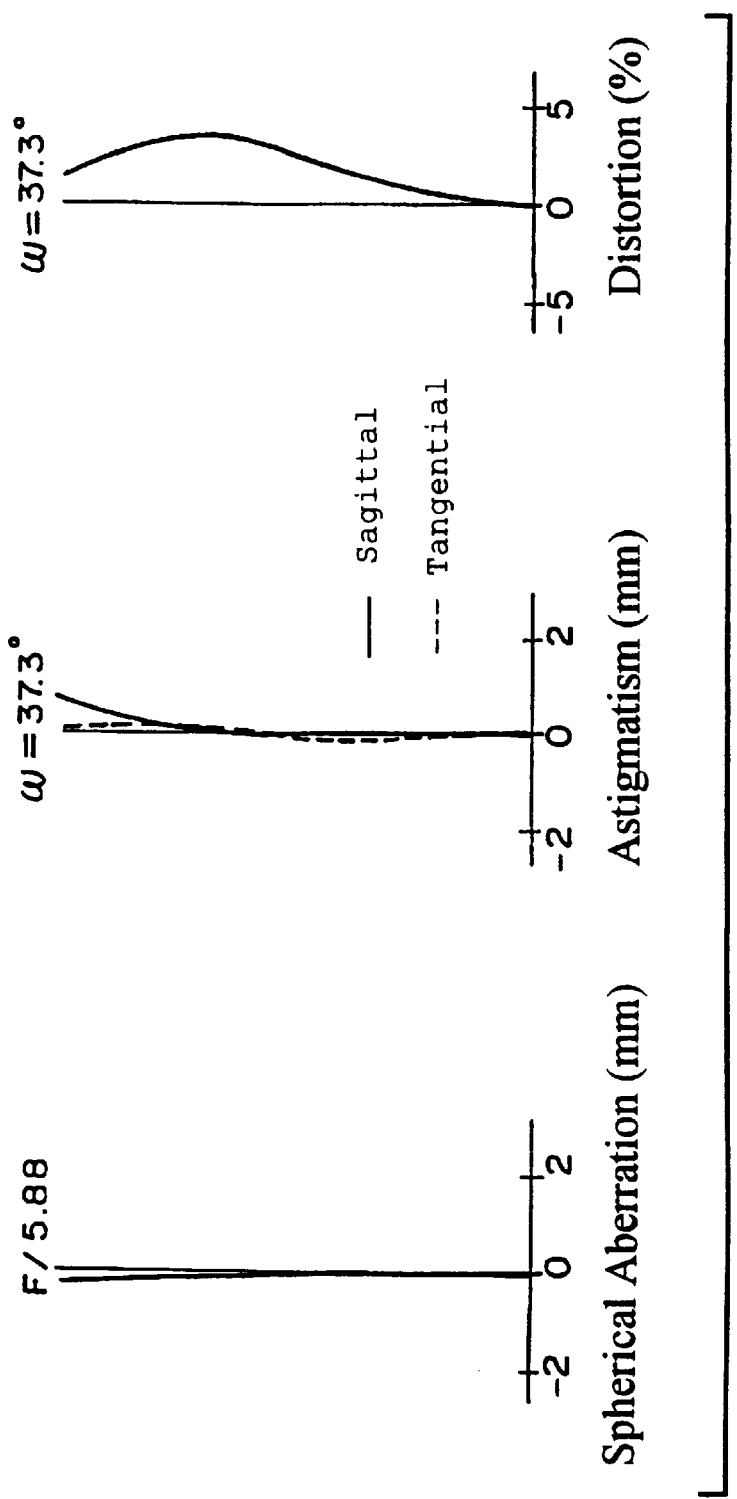
FIG. 2 illustrates the spherical aberration, astigmatism and distortion at the wide-angle end for the lens of Embodiment 1.
Figure 3:
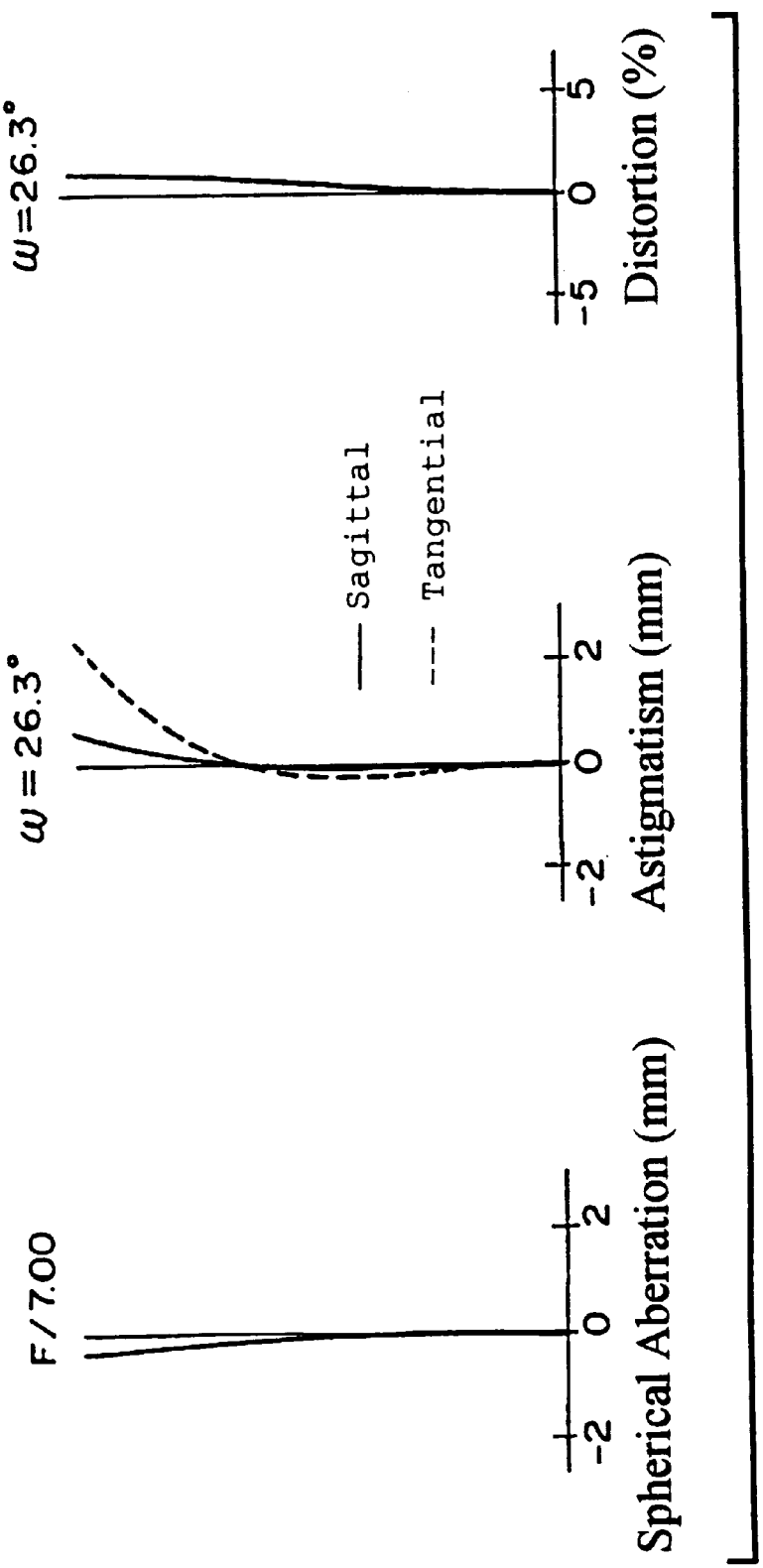
FIG. 3 illustrates the spherical aberration, astigmatism and distortion at the mid-position for the lens of Embodiment 1.
Figure 4:
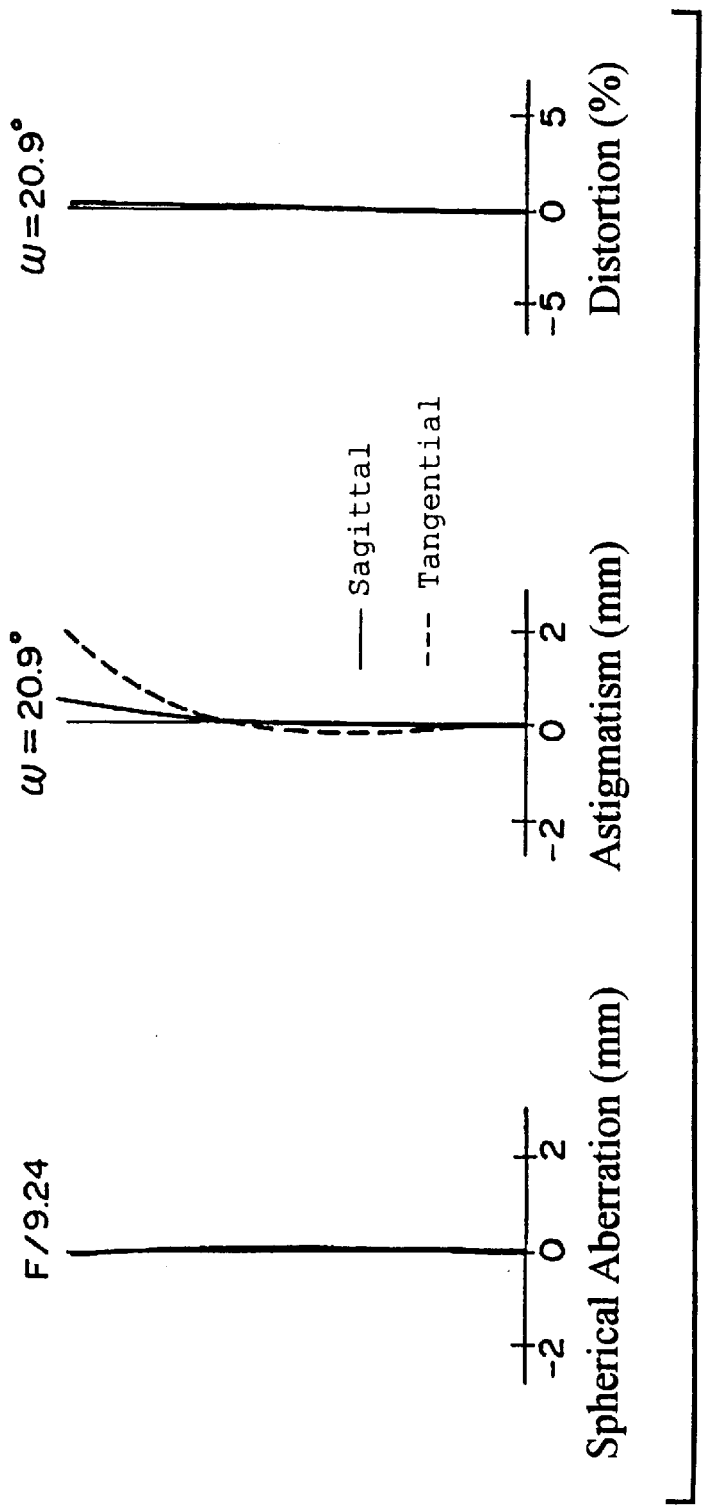
FIG. 4 illustrates the spherical aberration, astigmatism and distortion at the telephoto end for the lens of Embodiment 1.
Figure 5:
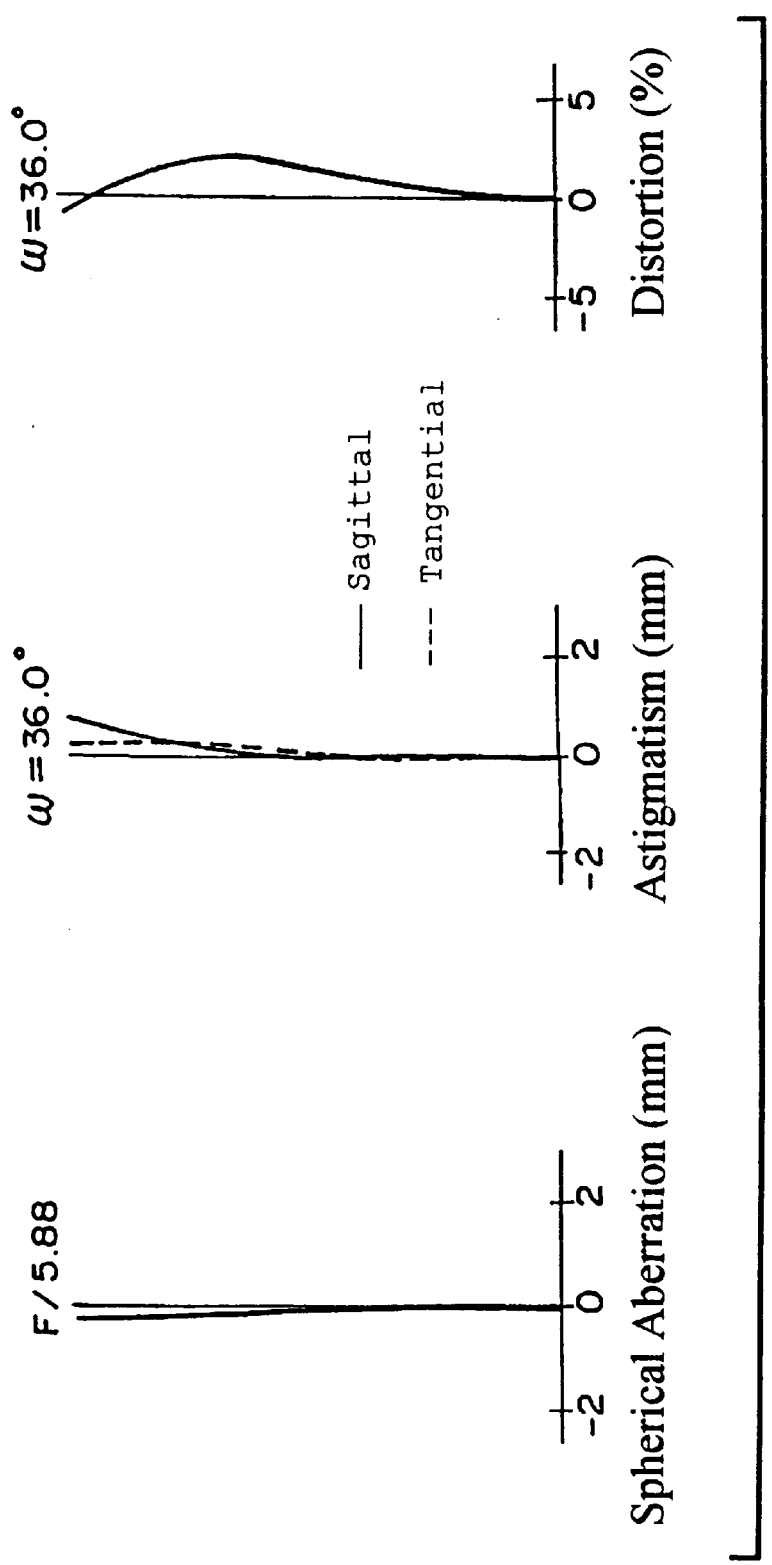
FIG. 5 illustrates the spherical aberration, astigmatism and distortion at the wide-angle end for the lens of Embodiment 2.
Figure 6:
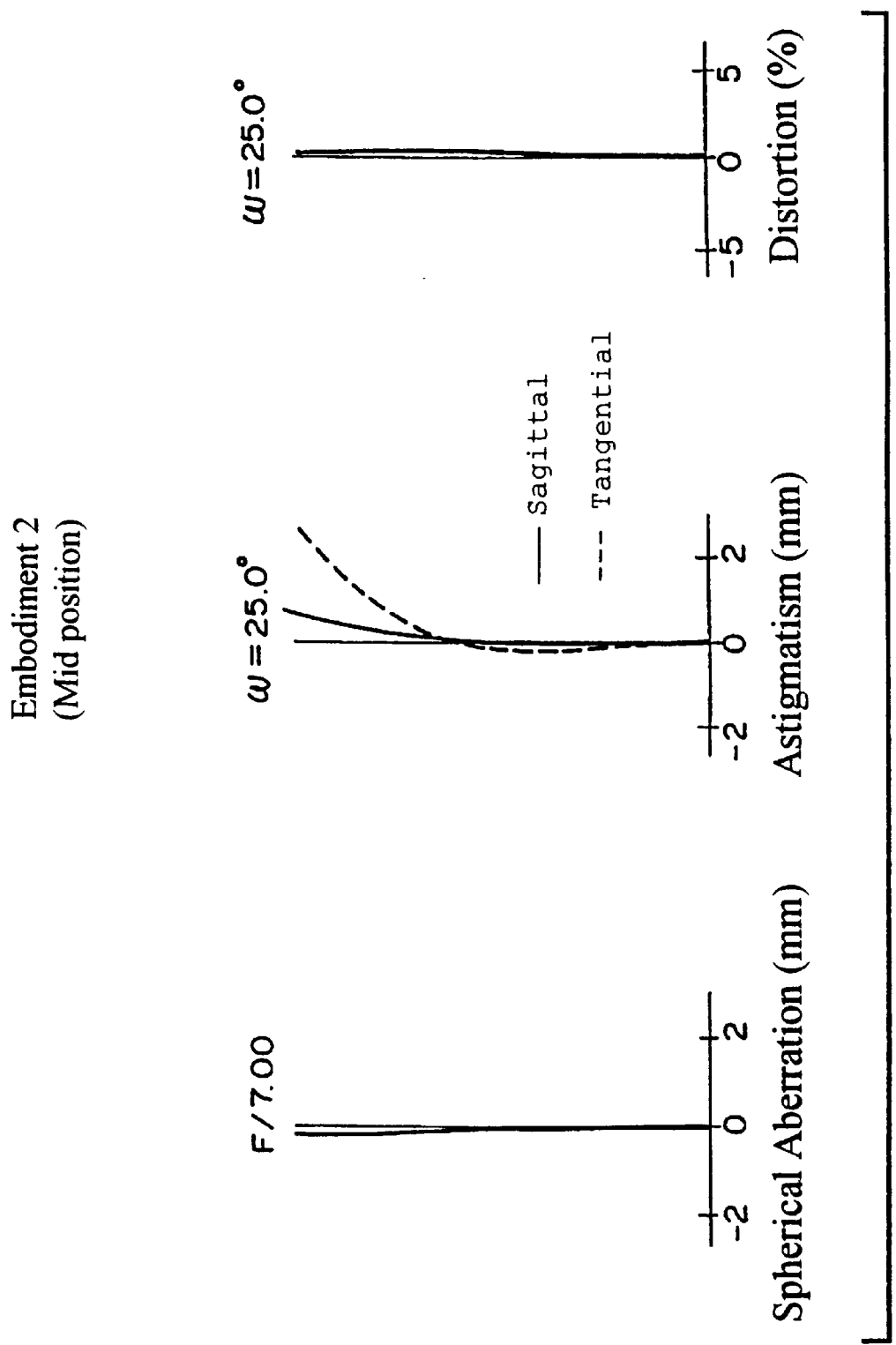
FIG. 6 illustrates the spherical aberration, astigmatism and distortion at the mid-position for the lens of Embodiment 2.
Figure 7:
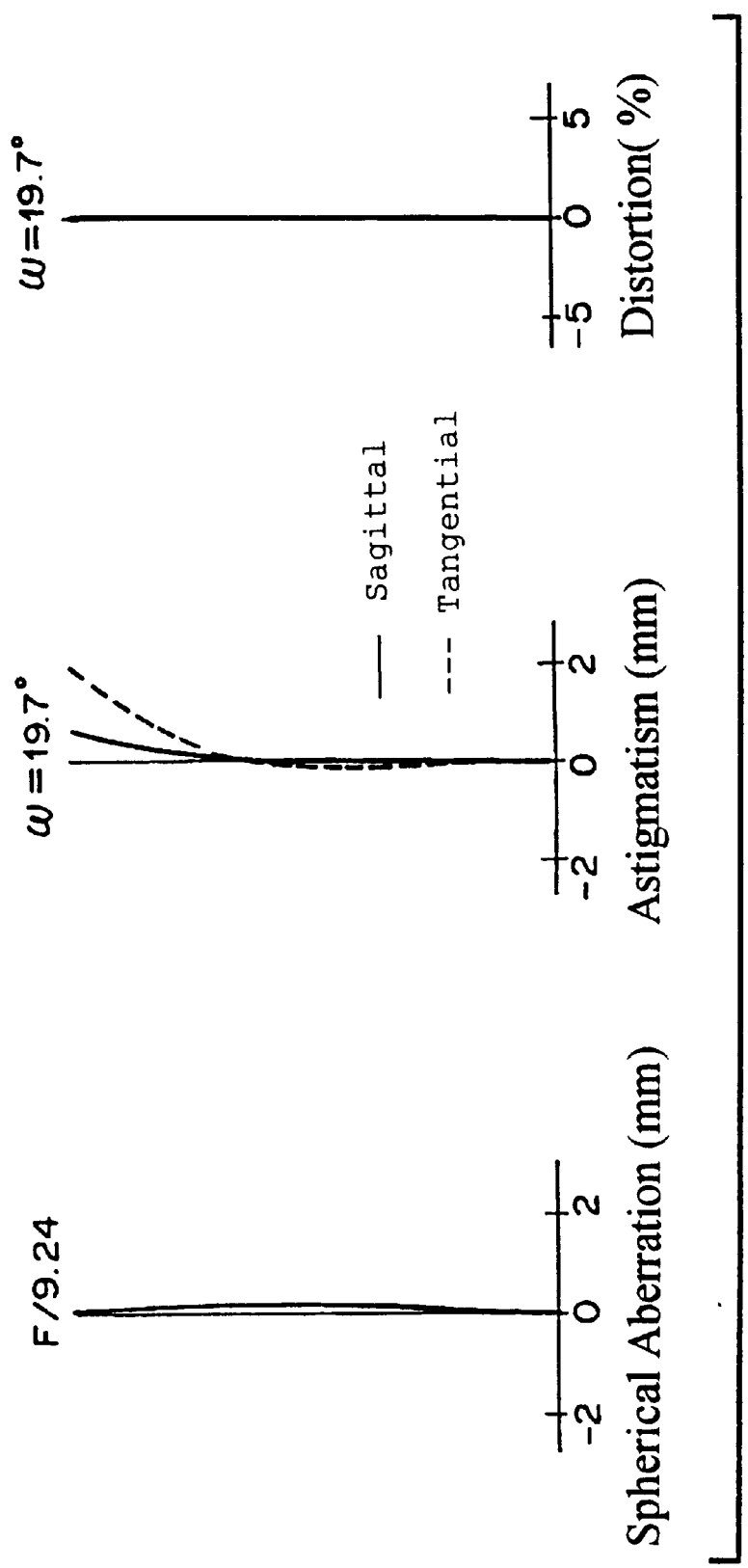
FIG. 7 illustrates the spherical aberration, astigmatism and distortion at the telephoto end for the lens of Embodiment 2.
Figure 8:
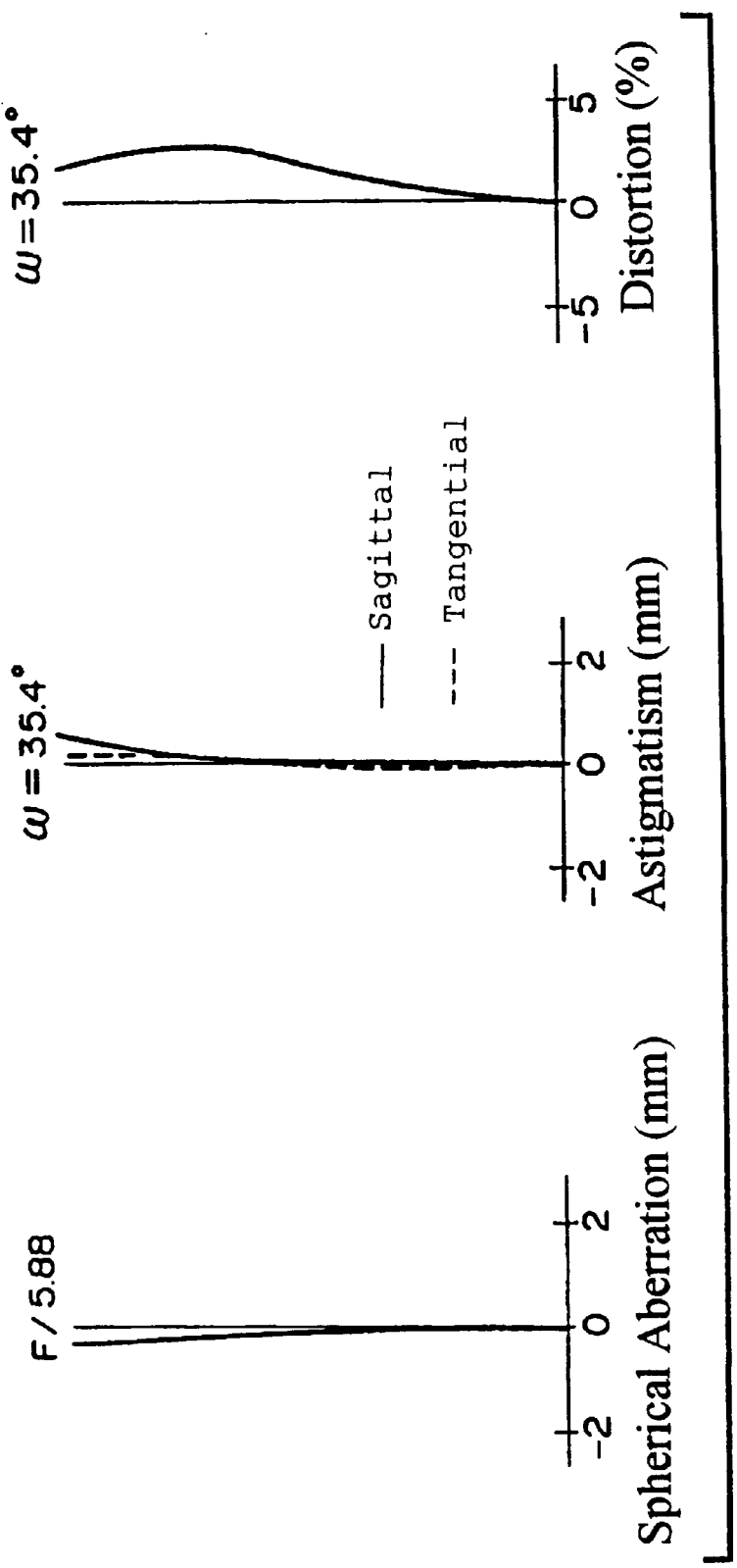
FIG. 8 illustrates the spherical aberration, astigmatism and distortion at the wide-angle end for the lens of Embodiment 3.
Figure 9:
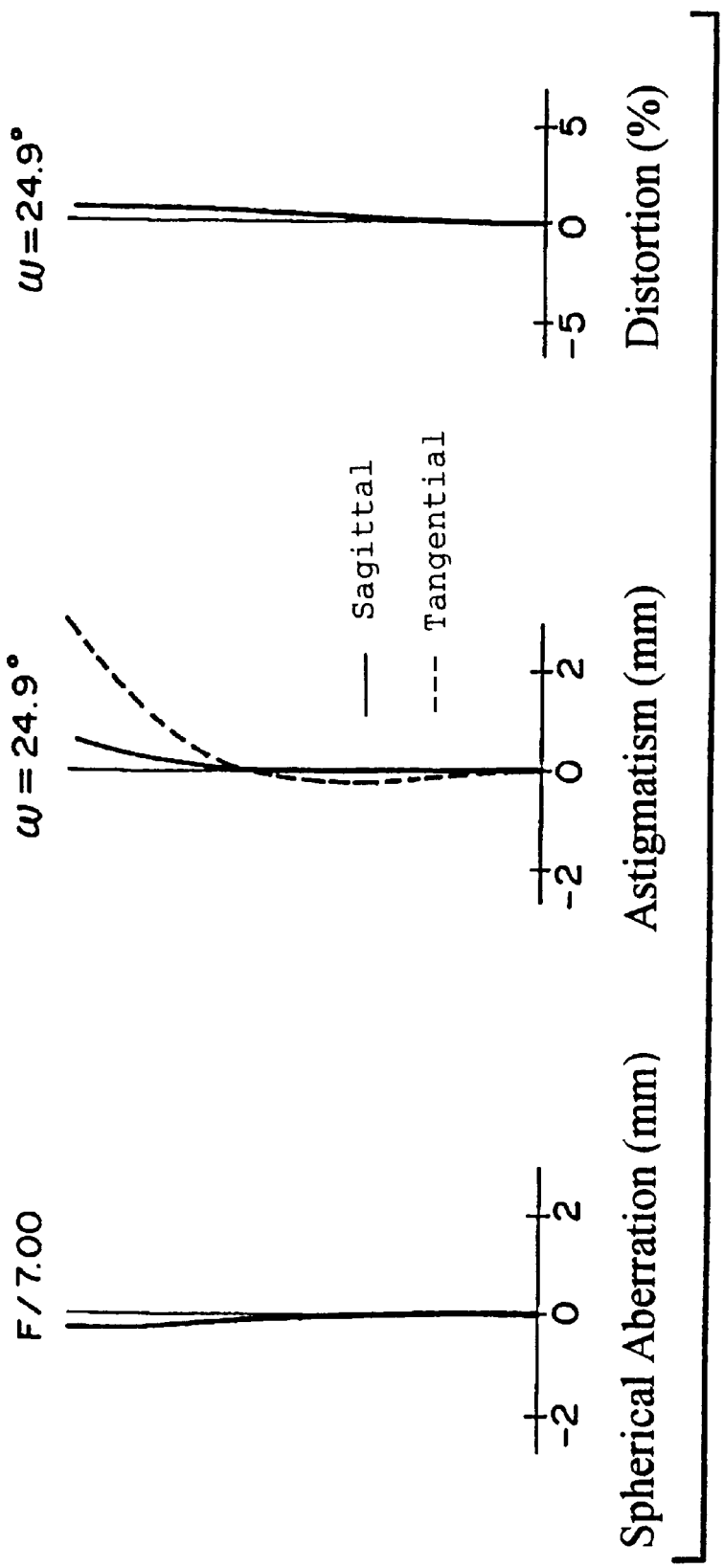
FIG. 9 illustrates the spherical aberration, astigmatism and distortion at the mid-position for the lens of Embodiment 3.
Figure 10:
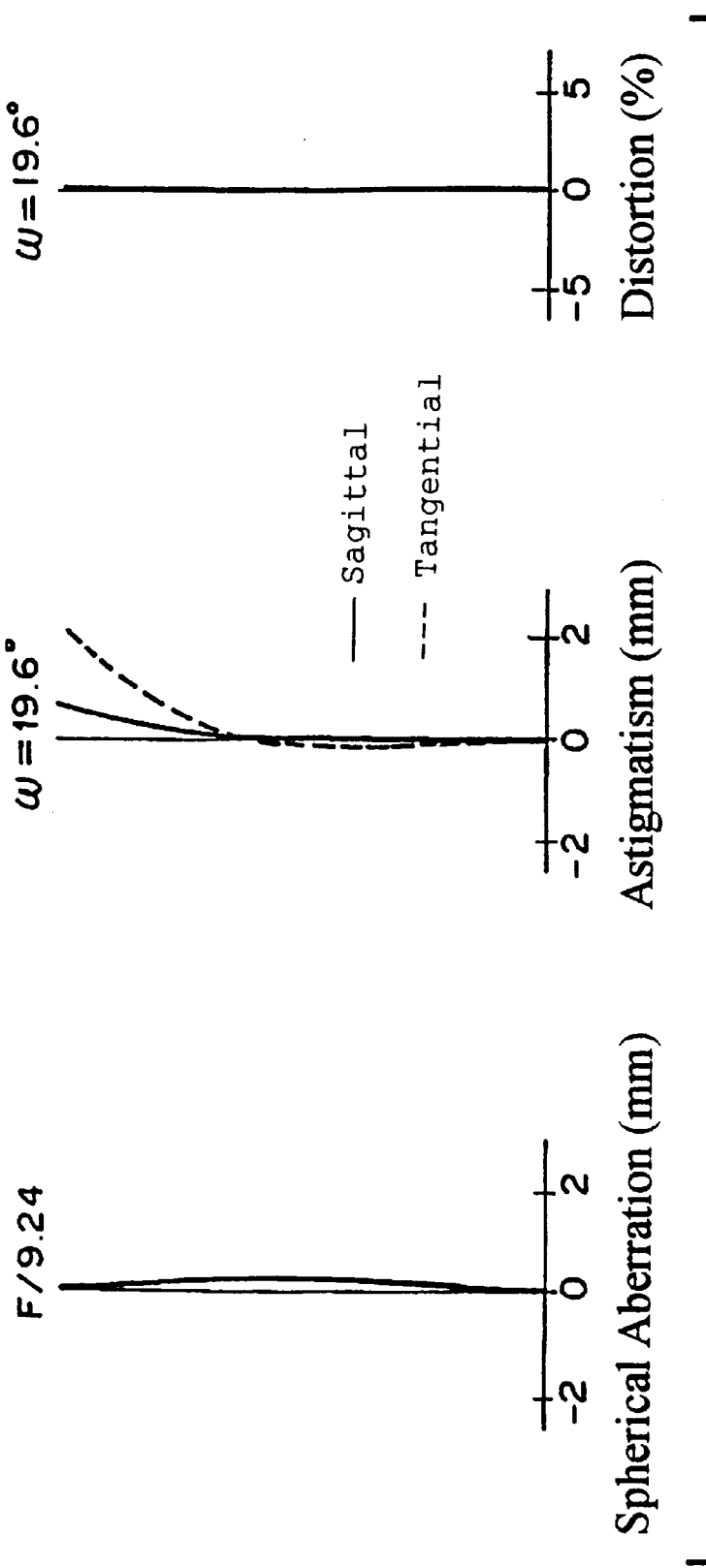
FIG. 10 illustrates the spherical aberration, astigmatism and distortion at the telephoto end for the lens of Embodiment 3.

FIGS. 2, 5, and 8 illustrate various aberrations (spherical aberration, astigmatism, and distortion) at the wide-angle end of the zoom lens in each of the embodiments, FIGS. 3, 6, and 9 illustrate these aberrations at the mid position of the zoom lens in each of the embodiments, and FIGS. 4, 7, and 10 illustrate these aberrations at the telephoto end of the zoom lens in each of the embodiments. In FIGS. 2–10, aberrations relative to the sagittal image plane and the tangential image plane are shown in each of the astigmatism plots. As is clear from these figures, each aberration is well corrected in each of the embodiments.

According to the compact two-group zoom lens of the invention, by carefully selecting the shapes of the lens element components used, it is possible to improve the compactness and the cost while keeping various aberrations acceptably low over the entire zoom range from a long distance to a short distance. Also, by individually regulating the aspherical shape of each plastic aspherical lens element surface, it is possible to improve the ease of manufacture.

As is apparent by adding up the distances between the lens elements so as to obtain the overall length $D_T$ (as measured along the optical axis between the outermost lens element surfaces), the zoom lens of the disclosed embodiments has a maximum overall length as follows.

TABLE 7

| Embodiment # | $D_T$(mm) |
| --- | --- |
| 1 | 21.445 |
| 2 | 20.97 |
| 3 | 20.88 |

Thus, each embodiment of the compact two-group zoom lens of the present invention has an image angle 2ω (i.e., field of view) of at least 70 degrees in the maximum wide-angle position and has a maximum overall length $D_T$ of less than 22 mm.

Of course, the compact two-group zoom lens of the invention is not to be limited to those specifically illustrated in the various embodiments. Rather the scope of the invention shall be defined as set forth in the following claims and their legal equivalents. Various modifications will occur to those skilled in the art as a result of reading the above description, and all such modifications as would be obvious to one of ordinary skill in the art are intended to be within the spirit of the invention disclosed.

What is claimed is:

1. A compact two-group zoom lens comprising, in order from the object side:

a positive first lens group including three lens elements, and a negative second lens group including two lens elements, zooming being performed by changing the distance between these two lens groups;

said first lens group including a first lens element that is a negative meniscus shape with its concave surface on the object side, a second lens element that is made of plastic and is a positive meniscus shape with its convex surface on the object side, and a third lens element that is biconvex;

said second lens group including a fourth lens element that is made of plastic and is a positive meniscus lens with its convex surface on the image side, and a fifth lens element that is a negative meniscus shape with its concave surface on the object side;

wherein the compact two-group zoom lens further satisfies the following conditions:

$$1.4 < f_w/f_1 < 2.0 \quad (1)$$

$$-0.77 < R_9/f_1 < -0.35 \quad (2)$$

where $f_w$ is the focal distance of the entire lens system at the wide-angle end, $f_1$ is the focal distance of the first lens group, and $R_9$ is the radius of curvature of the object side surface of the fifth lens element.

2. The compact two-group zoom lens as set forth in claim 1, wherein said second lens element has at least one aspherical surface of negative refracting power, and said fourth lens element has at least one aspherical surface.

3. The compact two-group zoom lens as set forth in claim 2, wherein said second lens element and said fourth lens element are each formed with acrylic-system resin.

4. The compact two-group zoom lens as set forth in claim 1, wherein the construction parameters are as set forth below:

| # | R | D | $N_d$ | $V_d$ |
| --- | --- | --- | --- | --- |
| 1 | −13.874 | 0.90 | 1.84665 | 23.9 |
| 2 | −25.977 | 1.49 | | |
| 3 | 250.000 | 1.20 | 1.49023 | 57.5 |
| 4 | 276.655 | 1.04 | | |
| 5 | 22.3397 | 3.40 | 1.48749 | 70.4 |
| 6 | −7.5370 | variable (8.13–4.00) | | |
| 7 | −20.333 | 2.23 | 1.49023 | 57.5 |
| 8 | −11.450 | 2.055 | | |
| 9 | −5.983 | 1.00 | 1.71300 | 53.9 |
| 10 | −37.468 | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ the Abbe number at the sodium d line.

5. The compact two-group zoom lens as set forth in claim 4, wherein the number 3, 4, 7 and 8 surfaces are aspheric.

6. The compact two-group zoom lens as set forth in claim 1, wherein the construction parameters are as set forth below:

| # | R | D | $N_d$ | $V_d$ |
| --- | --- | --- | --- | --- |
| 1 | −13.555 | 0.90 | 1.84665 | 23.9 |
| 2 | −25.721 | 1.49 | | |
| 3 | 120.000 | 1.20 | 1.49023 | 57.5 |
| 4 | 1000.000 | 1.04 | | |
| 5 | 26.099 | 3.40 | 1.48749 | 70.4 |
| 6 | −7.445 | variable (7.61–3.70) | | |
| 7 | −20.416 | 2.23 | 1.49023 | 57.5 |
| 8 | −11.676 | 2.10 | | |
| 9 | −5.944 | 1.00 | 1.72916 | 54.8 |
| 10 | −31.455 | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ the Abbe number at the sodium d line.

7. The compact two-group zoom lens as set forth in claim 6, wherein the number 3, 4, 7 and 8 surfaces are aspheric.

8. The compact two-group zoom lens as set forth in claim 1, wherein the construction parameters are as set forth below:

| # | R | D | $N_d$ | $V_d$ |
| --- | --- | --- | --- | --- |
| 1 | −13.602 | 0.90 | 1.80518 | 25.5 |
| 2 | −27.274 | 1.44 | | |
| 3 | 124.070 | 1.20 | 1.49023 | 57.5 |
| 4 | 461.173 | 1.03 | | |
| 5 | 24.989 | 3.40 | 1.48749 | 70.4 |
| 6 | −7.437 | variable (7.60–3.73) | | |
| 7 | −22.000 | 2.40 | 1.49023 | 57.5 |
| 8 | −11.598 | 1.91 | | |
| 9 | −6.083 | 1.00 | 1.71300 | 53.9 |
| 10 | −43.090 | | | | where # is the surface number, in order from the object side, R is the radius of curvature (in mm) of each lens element surface near the optical axis, D is the on-axis spacing (in mm) between each lens element surface, $N_d$ is the index of refraction and $V_d$ the Abbe number (at the sodium d line).

9. The compact two-group zoom lens as set forth in claim 8, wherein the number 3, 4, 7 and 8 surfaces are aspheric.

10. A compact two-group zoom lens comprising, in order from the object side:

a positive first lens group including three lens elements, and a negative second lens group including two lens elements, at least one of the first and second lens groups including a lens element having at least one aspherical surface, zooming being performed by changing the distance between these two lens groups;

wherein the compact two-group zoom lens satisfies the following conditions:

$2\omega \geq 70°$ $D_T < 22$ mm where, $2\omega$ is the image angle of the compact two-group zoom lens in its maximum wide-angle state, and $D_T$ is the overall maximum length of the compact two-group zoom lens as measured along the optical axis between the outermost lens element surfaces thereof.

11. The compact two-group zoom lens as set forth in claim 10, said first lens group including a first lens element that is a negative meniscus shape with its concave surface on the object side, a second lens element that includes an aspherical surface and is a positive meniscus shape with its convex surface on the object side, and a third lens element that is biconvex;

said second lens group including a fourth lens element that includes an aspherical surface and is a positive meniscus lens with its convex surface on the image side, and a fifth lens element that is a negative meniscus shape with its concave surface on the object side.

* * * * *

UNITED STATES PATENT AND TRADEMARK OFFICE
CERTIFICATE OF CORRECTION

PATENT NO : 5,991,095
DATED : Nov. 23, 1999
INVENTOR(S): Sato

Figure 1B:
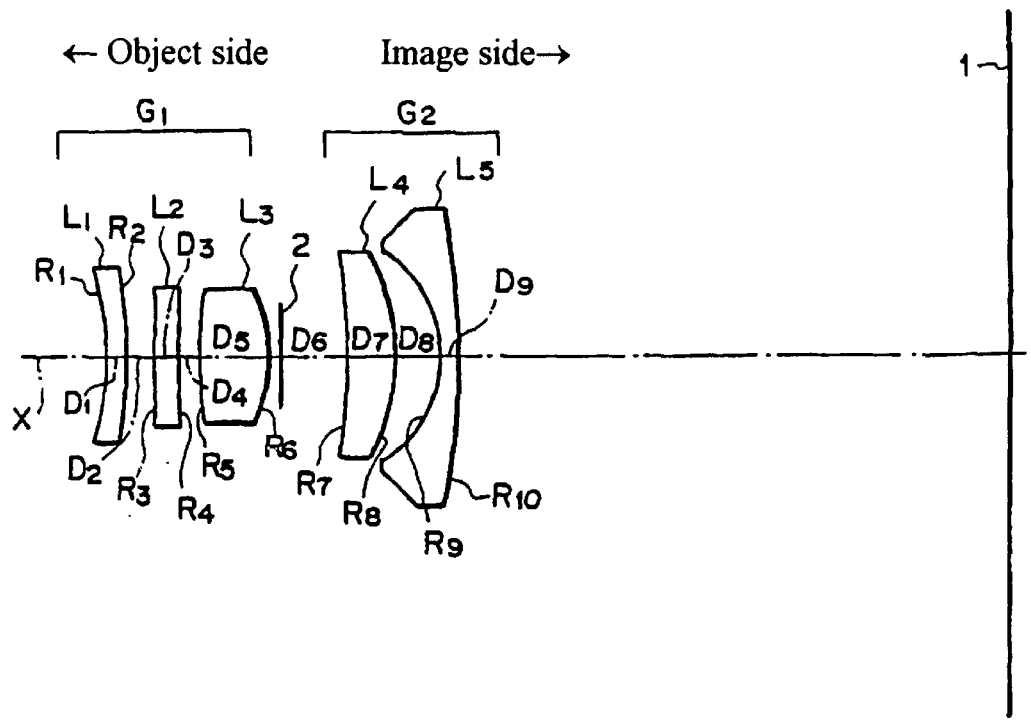

It is certified that error appears in the above-identified patent and that said Letters Patent is hereby corrected as shown below:

In column 1, at line 51, "FIG. 5(b)" should be - - FIG. 1(b)- -.
In Table 6, the value of $A_4$ for the surface # 3 should be preceded by a minus sign.

In Table 6, the value of $A_4$ for the surface # 7 should be preceded by a minus sign.

Signed and Sealed this

Second Day of May, 2000

Attest:

Q. TODD DICKINSON

Attesting Officer

Director of Patents and Trademarks